US007854589B2

(12) United States Patent
Nielsen et al.

(10) Patent No.: US 7,854,589 B2
(45) Date of Patent: Dec. 21, 2010

(54) WIND TURBINE, A METHOD FOR DAMPING EDGEWISE OSCILLATIONS IN ONE OR MORE BLADES OF A WIND TURBINE BY CHANGING THE BLADE PITCH AND USE HEREOF

(75) Inventors: Thomas Steiniche Bjertrup Nielsen, Randers (DK); Christopher John Spruce, Surrey (GB)

(73) Assignee: Vestas Wind Systems A/S (DK)

( * ) Notice: Subject to any disclaimer, the term of this patent is extended or adjusted under 35 U.S.C. 154(b) by 79 days.

(21) Appl. No.: 12/417,415

(22) Filed: Apr. 2, 2009

(65) Prior Publication Data
US 2009/0185901 A1 Jul. 23, 2009

Related U.S. Application Data

(63) Continuation of application No. PCT/DK2007/000403, filed on Sep. 10, 2007.

(51) Int. Cl.
*F03D 7/04* (2006.01)
(52) U.S. Cl. .............................. 416/1; 416/61; 416/500
(58) Field of Classification Search ................. 416/1, 416/61, 500; 415/118, 119; 290/44, 55
See application file for complete search history.

(56) References Cited

U.S. PATENT DOCUMENTS 4,329,117 A * 5/1982 Doman ................... 416/170 R

| 7,400,055 | B2 * | 7/2008 | Nagao ................. 290/44 |
| 7,692,822 | B2 * | 4/2010 | Tanaka ................ 358/474 |
| 2006/0033338 | A1 | 2/2006 | Wilson |
| 2009/0169378 | A1 * | 7/2009 | Menke ................. 416/1 |

FOREIGN PATENT DOCUMENTS

EP 1719910 A1 11/2006

(Continued)

OTHER PUBLICATIONS

Daniel Trudnowski and David Lemieux, Independent Pitch Control using Rotor Position Feedback for Wind-Shear and Gravity Fatigue Reduction in a Wind Turbine, Proceedings of the American Control Conference, Anchorage, AK, May 8-10, 2002, XP10597604A (6 pages).

(Continued)

*Primary Examiner*—Ninh H Nguyen
(74) *Attorney, Agent, or Firm*—St. Onge Steward Johnston & Reens LLC

(57) ABSTRACT

The invention relates to a wind turbine comprising a rotor including one or more pitchable blades, and detection means for detecting edgewise oscillations in one or more of said blades. The wind turbine is characterized in that the wind turbine comprises control means for changing the pitch angle of one or more of the blades if the detection means detects edgewise oscillations in one or more of the blades, hereby damping or eliminating the edgewise oscillations. The invention further relates to a method for damping edgewise oscillations in one or more blades of a wind turbine and use hereof.

18 Claims, 4 Drawing Sheets

FOREIGN PATENT DOCUMENTS

| | | | |
|---|---|---|---|
| EP | 1816347 | A1 | 9/2007 |
| GB | 2117933 | A | 10/1983 |
| WO | 9701709 | A1 | 1/1997 |
| WO | 99/32789 | A1 | 7/1999 |
| WO | 9936695 | A1 | 7/1999 |
| WO | 02084114 | A1 | 10/2002 |

OTHER PUBLICATIONS

Danish Search Report, May 11, 2007 (1 page).
International Search Report, Jan. 17, 2008 (3 pages).
International Preliminary Report on Patentability & Written Opinion of the International Searching Authority; PCT/DK2007/000403; Apr. 7, 2009; 7 pages.

* cited by examiner

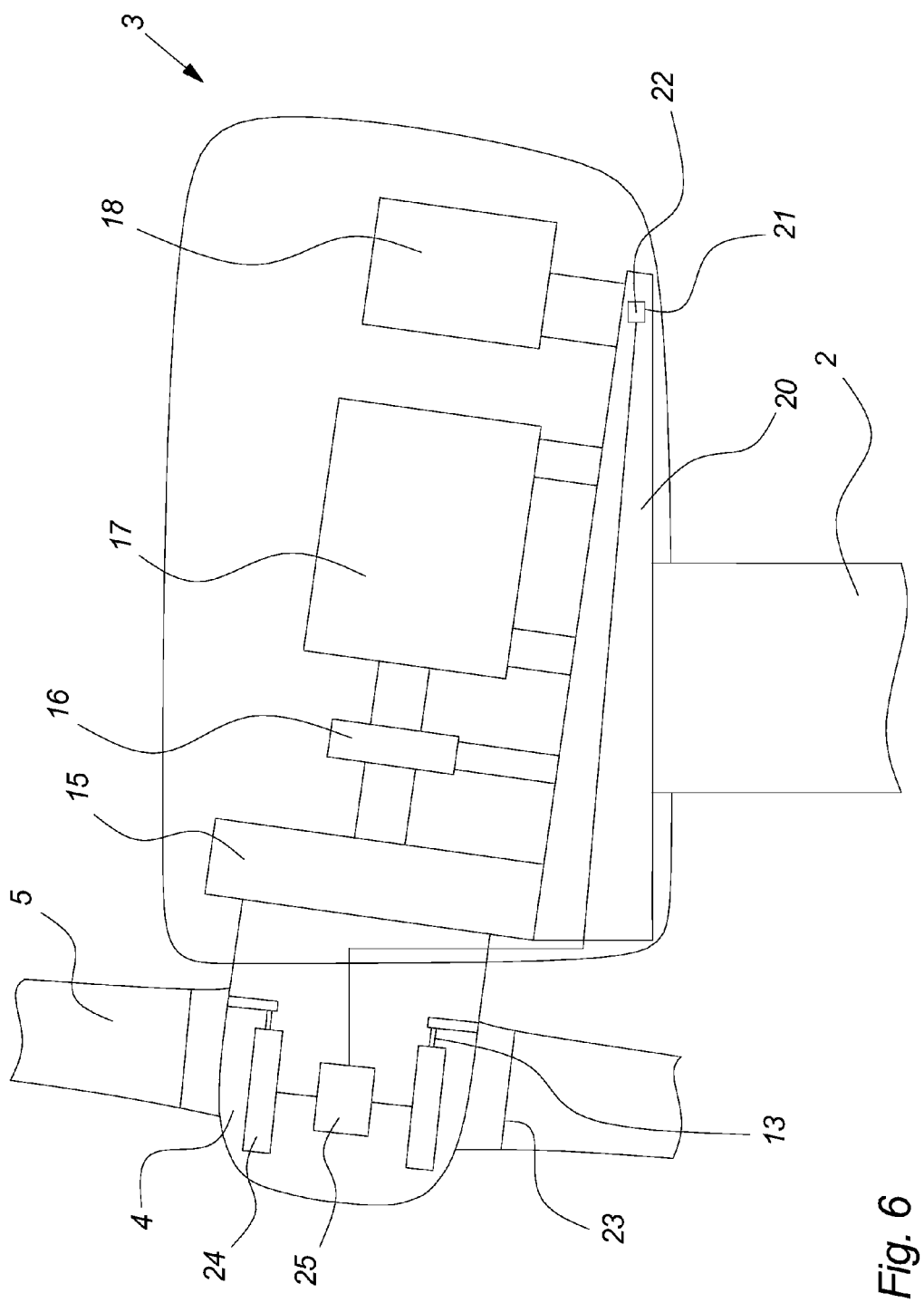

WIND TURBINE, A METHOD FOR DAMPING EDGEWISE OSCILLATIONS IN ONE OR MORE BLADES OF A WIND TURBINE BY CHANGING THE BLADE PITCH AND USE HEREOF

CROSS-REFERENCE TO RELATED APPLICATIONS

The present application is a continuation of pending International patent application PCT/DK2007/000403 filed on Sep. 10, 2007 which designates the United States and claims priority from Danish patent application PA 2006 01273 filed on Oct. 2, 2006, the content of which is incorporated herein by reference.

FIELD OF THE INVENTION

The invention relates to a wind turbine comprising a rotor including one or more pitchable blades, detection means for detecting edgewise oscillations in one or more of said blades and a method for damping edgewise oscillations in one or more blades of a wind turbine and use hereof.

BACKGROUND OF THE INVENTION

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

Oscillations and vibrations of the wind turbine blades are undesirable in that in worst-case they can damage the blades. In particular edge-wise oscillations, which are oscillations along the chord between the trailing edge and the leading edge of the blade, can damage the blade, in that the blade has little damping towards this mode of oscillations.

Furthermore, edgewise oscillations are particularly harmful, in that they among other things can cause cracks at the root of the blade or along the trailing edge. In known cases such oscillations has caused the blade to fail to such degree, that the blade has disintegrated from the turbine.

Both stall and pitch controlled wind turbine are in risk of being damaged by edge-wise oscillations. The stall controlled turbine is mostly seeing this problem when operating in high winds beyond the stall point and the pitch regulated turbine is mostly seeing this problem in high wind where sudden wind gusts can cause the blades to stall momentarily.

To eliminate harmful oscillations of the blades it is known to shut down the wind turbine for a period of time, if potentially damaging edgewise oscillations of the blades is detected. But if these oscillations are detected often, this method will seriously reduce the overall output of the wind turbine.

It is also known to provide the blades with different forms of mechanical dampers, most often based on the principle of a spring mounted mass combined with a damping device or they can be provided with different kinds of liquid dampers.

An example of a liquid damper is disclosed in WO 99/32789, where the tips of the blades are provided with a tuned liquid damper system. A liquid flows freely in a number of cambers placed as close to the tip of the blade as possible. The chambers have a specific length, which is adapted to the natural edgewise frequency of the specific blade type. Even though these kinds of frequency specific dampers weigh less than traditional multi-frequency dampers, they still have the disadvantage of adding considerable weight to the tip of the blade, where weight is least desired and under all circumstances it is undesired to provide anything that can break down in the blades, both because the inside of the blades can be very difficult to access and because any extra weight in the blades is undesired.

An object of the invention is to provide for a wind turbine comprising means for damping or eliminating edgewise oscillations in the blades, which do not present the mentioned disadvantages.

Furthermore, it is an object of the invention to provide for a simple and cost-efficient technique for damping or eliminating edgewise oscillations of one or more blades of a wind turbine.

SUMMARY OF THE INVENTION

The invention provides for a wind turbine comprising a rotor including one or more pitchable blades, and detection means for detecting edgewise oscillations in one or more of said blades. The wind turbine is characterized in that the wind turbine comprises control means for changing the pitch angle of one or more of the blades if the detection means detects edgewise oscillations in one or more of the blades, hereby damping or eliminating the edgewise oscillations.

Certain conditions have to be present for edgewise oscillations to occur in the wind turbine blades: the wind has to have a certain speed and/or instability, the blades have to have a certain design, the blades have to be placed at a certain pitch angle and other. Most of these conditions can not be controlled or at least can not be controlled inexpensively—except for the pitch angle of the blades.

Active stall controlled wind turbines and pitch controlled wind turbines are by nature provided with the ability to change the pitch angle of the blades to control the power output of the rotor or the wind turbine and to protect the blades or the wind turbine from damaging overloads.

The ability to pitch the wind turbine blades is therefore already present in most modern wind turbines and by using this ability to alter at least one of the conditions needed for edgewise oscillations to occur or at least for edgewise oscillations to build up is advantageous, in that simple and cost-efficient means hereby is provided for damping or eliminating the edgewise oscillations in the blades of a wind turbine.

In an aspect of the invention, said control means comprise means for pitching said blades in a direction which reduces the lift of said blades during normal operation, if said detection means detects edgewise oscillations in one or more of said blades.

Edgewise oscillations in wind turbine blades usually only occur at relatively high wind speeds. If—during normal operation of the blades—the blades where pitched in a direction which increases the lift, when edgewise oscillations was detected, the risk of overloading the blades or the wind turbine would increase significantly.

It is therefore advantageous to pitch the blades in a direction which reduces the lift of the blades i.e. turn the blades on an active stall controlled wind turbine more up against the relative wind, hereby increasing the drag and making them go deeper into stall or turn the blades on a pitch controlled wind turbine more out of the relative wind, hereby reducing the drag and making the edgewise chord of the blades more parallel with the direction of the relative wind.

In an aspect of the invention, said control means comprise means for changing the pitch angle of all the blades of said rotor substantially equally, if said detection means detects edgewise oscillations in one or more of said blades.

It can be difficult and/or expensive to determine which of the blades that are oscillating edgewise, and it is therefore advantageous to pitch all the blades if edgewise oscillations are detected on any of the rotor blades.

In an aspect of the invention, said detection means are one or more oscillation sensors placed in a nacelle of said wind turbine.

By placing an oscillation sensor in the nacelle it is possible to detect edgewise oscillations of the blades in a very simple way. Furthermore, the entire rotor rotates during normal operation and it is therefore advantageous to place the oscillation sensors in the (more fixed) nacelle.

In an aspect of the invention, said oscillation sensors are one or more accelerometers connected to the strengthening structure of said nacelle.

Accelerometers are a simple and cost-efficient way of detecting vibrations and by placing one or more accelerometers on the strengthening structure of the nacelle, it is ensured that the edgewise oscillations of the blades are transferred relatively undisturbed to the sensor, providing clear and reliable sensor measurements.

In an aspect of the invention, said control means comprise means for changing said pitch angle of one or more of said blades between 0.5° and 30°, preferably between 2° and 15° and most preferred between 3° and 8° if said detection means detects edgewise oscillations in one or more of said blades.

If the blades are pitched too little, when edgewise oscillations is detected, the oscillations might not be dampened or it takes a relative long time for the oscillations to stop. If the blades are pitched too much the power production stops or it is reduced relatively much.

The present ranges for changing the pitch angles—when edgewise oscillations are detected—therefore presents an advantageous relation between damping efficiency and power output.

It should be emphasised that this change in pitch angle is relative—meaning that it is an extra change aside from the pitch angle change being preformed to optimise the blades angle to the incoming wind in relation to power output, load, noise or other.

In an aspect of the invention, said control means comprise means for returning said one or more blades to their original pitch angle position, when said detection means detects that the size of said edgewise oscillations is below a predefined level.

This is advantageous, in that the power output of the wind turbine is re-established fast, hereby ensuring that the overall power output of the wind turbine is maintained at a high level.

In an aspect of the invention, said control means comprise means for only changing the pitch angle of one or more of said blades if said detected edgewise oscillations is above a predefined level.

Changing the blades pitch angle from their substantially optimal position power-production-wise, will of course reduce the power output of the wind turbine, so if the size of the edgewise oscillations is only minor and non-damaging, it is advantageous to refrain from pitching the blades if the size of the oscillations is below a certain level.

In an aspect of the invention, said control means further comprise a timer for giving of an alarm signal if the size of said edgewise oscillations has not dropped below a predefined level within a predefined period of time.

If the size of the edgewise oscillations has not dropped below a predefined level within a predefined period of time, something could be wrong or the blades could be damaged from the oscillations and it is therefore advantageous to make the control means give of an alarm. This alarm signal could then trigger that the wind turbine was shut down or it could be transferred to a surveillance centre or other that could evaluate the situation and take the necessary actions.

The invention further provides for a method for damping edgewise oscillations in one or more blades of a wind turbine, said method comprising the steps of detecting if one or more of said blades oscillates edgewise, and changing the pitch angle of one or more of said blades if edgewise oscillations is detected in one or more of said blades.

Hereby is provided a simple and cost-efficient method for damping or eliminating edgewise oscillations in wind turbine blades.

In an aspect of the invention, said pitch angle of said one or more blades is only changed if the size of said edgewise oscillations is above a predefined level in one or more of said blades.

In an aspect of the invention, said one or more blades is returned to their original pitch angle position, when the magnitude of said edgewise oscillations has dropped below a predetermined level.

In an aspect of the invention, the pitch angle of all of said blades of said wind turbine are changed substantially equally if edgewise oscillations is detected in one or more of said blades.

In an aspect of the invention, an alarm signal is created if the magnitude of said edgewise oscillations have not dropped below a predetermined level within a predetermined time.

In an aspect of the invention, said blades are pitched in a direction which reduces the lift of said blades during normal operation, if said detection means detects edgewise oscillations in one or more of said blades.

Even further the invention provides for use of a method according to any of claims 10 to 15, wherein said wind turbine is an active stall controlled wind turbine comprising means for detecting edgewise oscillations.

Using the mentioned method on an active stall controlled wind turbine is advantageous, in that due to the fact that the blades of active stall controlled wind turbines stalls during normal operation, the chance of edgewise oscillations occurring is particularly high with this type of wind turbine. Furthermore, the design of the blades on active stall controlled wind turbines makes them particularly vulnerable to edgewise oscillations and it is therefore particularly advantageously to use this method on blades of an active stall controlled wind turbine.

BRIEF DESCRIPTION OF THE DRAWINGS

The invention will be described in the following with reference to the figures in which FIG. 1. illustrates a large modern wind turbine known in the art, as seen from the front, FIG. 6 illustrates a simplified cross section of a nacelle, as seen from the side.

DETAILED DESCRIPTION OF THE INVENTION

Figure 1:
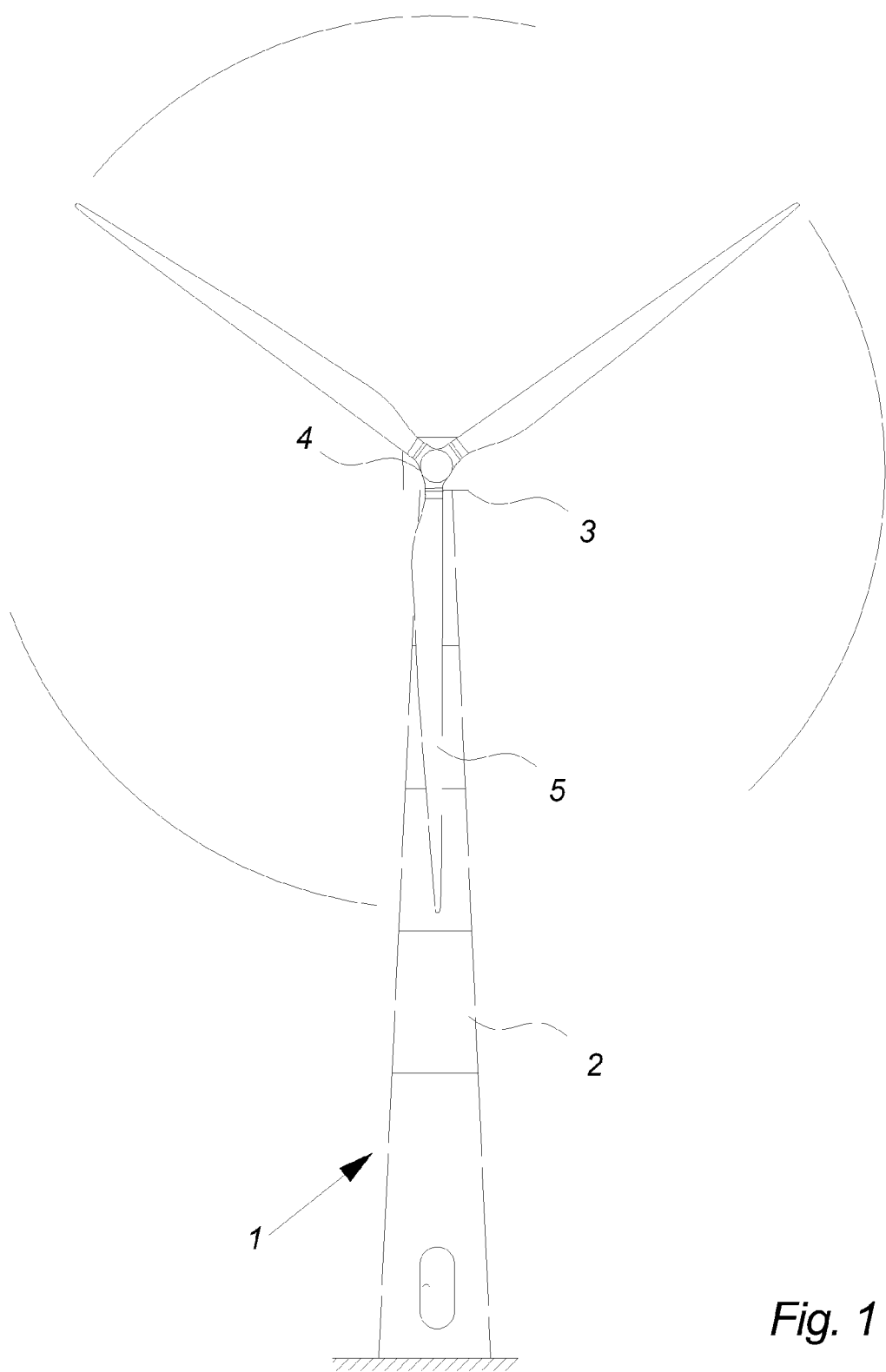

FIG. 1 illustrates a modern wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
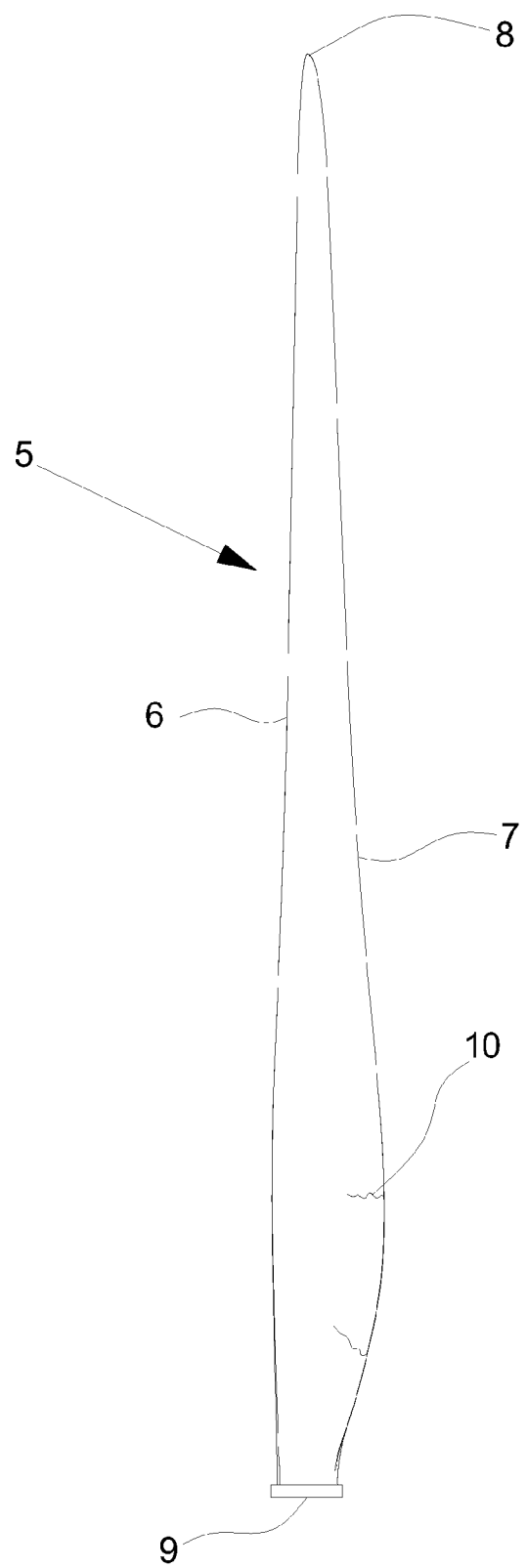
FIG. 2 illustrates a wind turbine blade, as seen from the front.

FIG. 2 illustrates a wind turbine blade 5, as seen from the front/pressure side 11. The wind turbine blade 5 comprises a leading edge 6, a trailing edge 7, a tip 8 and a root 9. A wind turbine blade 5 known in the art is typically made of a glass fibre and resin composite reinforced by carbon fibre, carbon fibre reinforced wood or a combination hereof.

A wind turbine blade 5 known in the art, has an elastic centre which is closer to the leading edge 6 than to the trailing edge 7, at least regarding most parts of the blade 5. If edgewise oscillations occur at a frequency at or close to the blades first natural edgewise frequency, especially the trailing edge 7 is therefore exposed to considerable strain, which under certain conditions can damaged the blade 5 and result in cracks 10 along the trailing edge 7.

Figure 3:
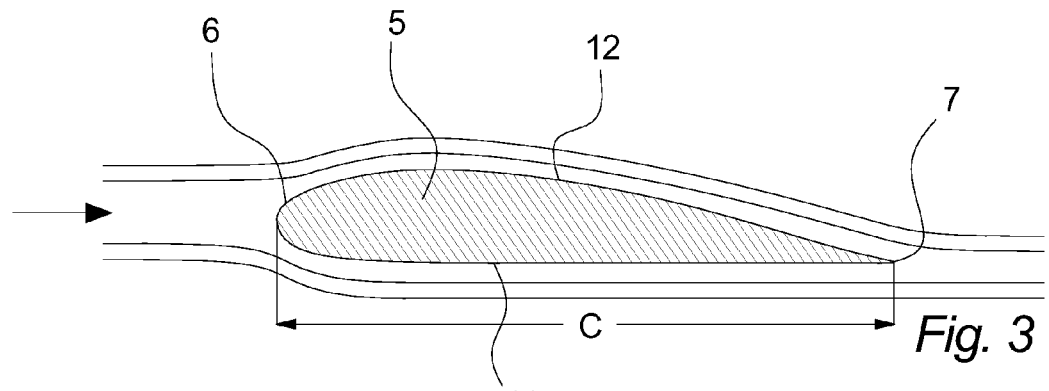
FIG. 3 illustrates a cross-section of a wind turbine blade in a non-stall situation, as seen from the root of the blade.

FIG. 3 illustrates a cross-section of a wind turbine blade 5 in a non-stall situation, as seen from the root 9 of the blade 5.

The blade 5 illustrated in FIG. 3 is a blade 5 on an ordinary pitch regulated wind turbine 1, shown during normal operation. In another embodiment it could also be a blade 5 on an active stall regulated wind turbine 1, operating in low wind or during start up before the blade 5 starts to stall.

On a pitch controlled wind turbine 1 the turbines electronic controller checks the power output of the turbine 1 e.g. several times per second. When the power output becomes too high, the controller sends an order to the blade pitch mechanism 13, which immediately pitches (turns) the rotor blades 5 slightly out of the wind. Likewise, the blades 5 are turned back into the wind whenever the wind drops again. During normal operation the blades 5 of a pitch regulated wind turbine 1 usually only pitch a fraction of a degree at a time—and the rotor 4 will be turning at the same time.

Most known pitch controlled wind turbines 1 do not comprise detection means 21 for detecting edgewise oscillations of the blades 5 and do therefore neither comprise active means for damping or eliminating these vibrations. When providing a pitch controlled wind turbine 1 with means according to the invention, it is therefore possible to increase the output of the blades 5, because it is possible to reduce the margin of safety to stall, in that means is hereby provided to the wind turbine 1 for damping or eliminating damaging edgewise oscillations if they should occur.

On a pitch controlled wind turbine 1, the controller will generally pitch the blades 5 slightly every time the wind changes in order to keep the rotor blades 5 at the optimum angle in order to maximise output for all wind speeds or at least up to a certain wind speed such as 25 meters/sec., where the blades 5 are turned completely out of the wind—making the blade chord C (the line between the trailing edge 7 and the leading edge 6) substantially parallel with the wind direction, making the rotor 4 stop rotating or at least making it idle. Doing this protects the blades 5 from damaging overload at high wind speeds and this is one of the reasons that the blades 5 of a pitch controlled wind turbine 1 can be made relative long and slender, compared to blades 5 of an active stall regulated wind turbine 1.

The blades 5 on a pitch controlled wind turbine 1 do usually not stall during normal operation, in that the blades 5 are pitched out of the wind before stall can occur. But under certain circumstances gusts of wind can arise so fast, that the turbines 1 control is not able to react fast enough and for a short period of time stall can occur. These short stall periods can induce edgewise oscillations in the blade 5, which potentially can be very damaging. Particularly if these gusts happen rhythmically at a frequency at or close to the blades 5 first natural edgewise frequency the energy of the edgewise oscillations can build up.

Figure 4:
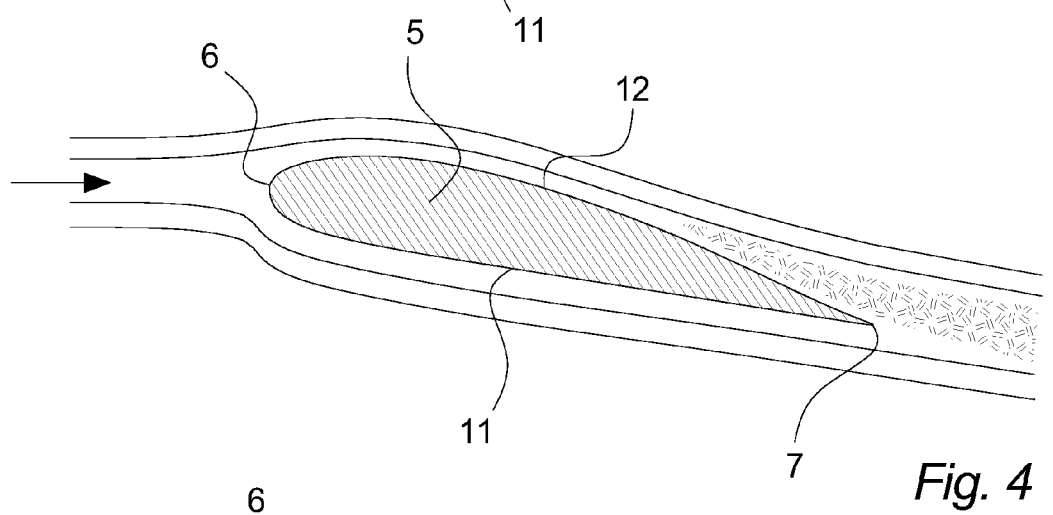
FIG. 4 illustrates a cross-section of a wind turbine blade in a stall situation, as seen from the root of the blade.

FIG. 4 illustrates a cross-section of a wind turbine blade 5 in a stall situation, as seen from the root 9 of the blade 5.

The blade 5 illustrated in FIG. 4 is a blade 5 on an active stall regulated wind turbine 1, shown during normal operation. In another embodiment it could also be a blade 5 on a pitch regulated wind turbine 1, illustrated during a sudden gust of wind creating an undesired stall situation.

Technically an active stall controlled wind turbine 1 resembles a pitch controlled wind turbine 1, in that they both have pitchable blades, and in order to get a reasonably large torque (turning force) at low wind speeds, the active stall controlled wind turbine 1 will usually be programmed to pitch the blades 5 much like a pitch controlled wind turbine 1 at low wind speeds. When the active stall controlled wind turbine 1 reaches its rated power, however, one will notice an important difference from the pitch controlled wind turbines 1: If the generator is about to be overloaded, the active stall controlled wind turbine 1 will pitch its blades 5 in the opposite direction from what a pitch controlled wind turbine 1 does. In other words, it will increase the angle of attack of the rotor blades 5 in order to make the blades 5 go into a deeper stall, thus wasting the excess energy in the wind. At high wind speeds the blades 5 of an active stall controlled wind turbine 1 will therefore have to be able to withstand a much higher extreme load than blades 5 of a pitch controlled wind turbine 1, both just to keep the blades 5 from breaking and to keep the blades 5 from bending so much that there is a risk of them hitting the tower 2. The blades 5 of an active stall controlled wind turbine 1 are therefore made more rugged and heavy than blades 5 of a pitch controlled wind turbine 1.

Furthermore, stall creates noise and to reduce the noise emission from the active stall controlled wind turbine 1 the rotor 4 rotates slower than the rotor 4 of a pitch controlled wind turbine 1. The blades 5 of an active stall controlled wind turbine 1 therefore have to be bigger and wider to be able to utilize the energy of the wind efficiently.

One of the advantages of active stall controlled wind turbines 1 compared to passive stall controlled wind turbines 1 is that the power output can be controlled more accurately, so as to avoid overshooting the rated power of the wind turbine 1 at the beginning of a gust of wind. Another advantage is that active stall controlled wind turbines 1 can be run almost exactly at rated power at all high wind speeds at least up to a certain maximum wind speed. A normal passive stall controlled wind turbine 1 will usually have a drop in the electrical power output for higher wind speeds, as the rotor blades 5 go into deeper stall.

Figure 5:
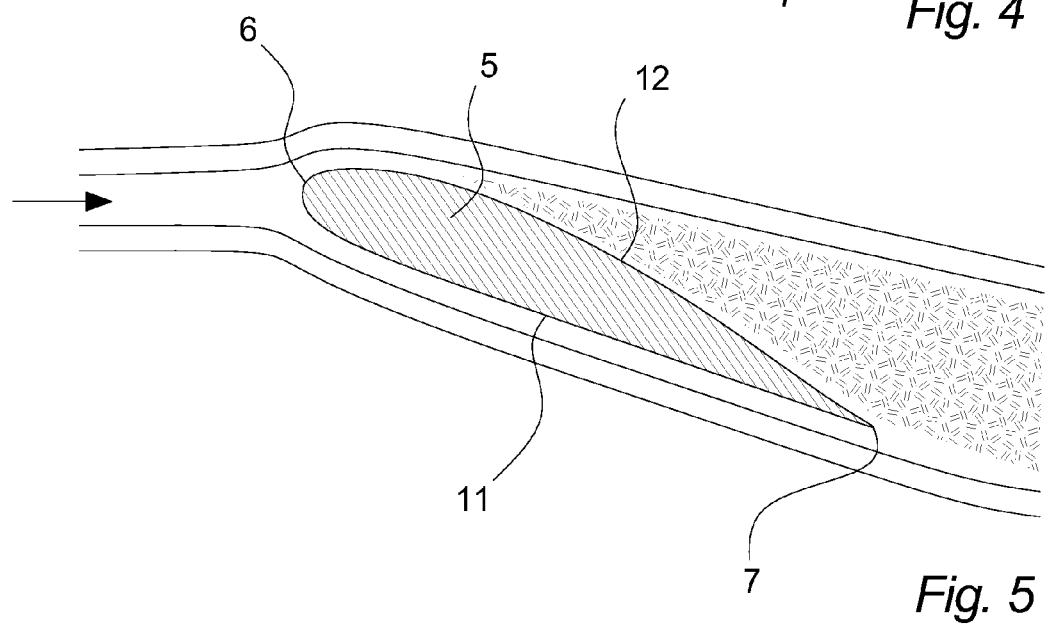
FIG. 5 illustrates a cross-section of a wind turbine blade in a deep stall situation, as seen from the root of the blade.

FIG. 5 illustrates a cross-section of a wind turbine blade 5 in a deep stall situation, as seen from the root 9 of the blade 5.

The blade 5 illustrated in FIG. 5 is a blade 5 on an active stall regulated wind turbine 1, shown during operation at very high wind speeds.

In this embodiment the blade 5 is pitched into the wind making it stall and substantially lose all the energy of the wind to protect the wind turbine 1 from damaging overloads.

FIG. 6 illustrates a simplified cross section of a nacelle 3 of an active stall regulated wind turbine 1, as seen from the side. Nacelles 3 exists in a multitude of variations and configurations but in most cases the drive train in the nacelle 3 comprise one or more of the following components: a gear 15, a coupling (not shown), some sort of breaking system 16 and a generator 17. A nacelle 3 of a modern wind turbine 1 can also include a converter 18 (also called an inverter) and additional peripheral equipment such as further power handling equipment, control cabinets, hydraulic systems, cooling systems and more.

The weight of the entire nacelle 3 including the nacelle components 15, 16, 17, 18 is carried by a strengthening structure 19. The components 15, 16, 17, 18 are usually placed on and/or connected to this common load carrying structure 19. In this simplified embodiment the strengthening structure 19 only extends along the bottom of the nacelle 3 e.g. in form of a bed frame 20 to which some or all the components 15, 16, 17, 18 are connected. In another embodiment the strengthening structure 19 could comprise a gear bell transferring the load of the rotor 4 to the tower 2, or the load carrying structure 19 could comprise several interconnected parts such as latticework.

In this embodiment of the invention the drive train is established in an angle in relation to a horizontal plane. The drive train is for among other reasons angled to enable that the rotor 4 can be angled correspondingly e.g. to ensure that the blades 5 do not hit the tower 2, to compensate for the differences in wind speed at the top and bottom of the rotor 4 and other.

In this embodiment of the invention detection means 21 is placed at the back of the nacelle in the form of one accelerometer 22 attached to the back of the bed frame 20. In this embodiment the accelerometer 22 is mounted in such a way that horizontal or substantially horizontal oscillations of the nacelle—originating from edgewise oscillations of the blades—is detected.

Edgewise oscillations of the blades 5 make the nacelle 3 oscillate slightly around the centre of the tower, i.e. in yawing direction, which is why these oscillations can be detected relatively reliably at the back of the nacelle 3. Typical frequencies of edgewise oscillations (first natural frequency) are in the interval of 0.9-1.8 Hz. As an example the frequencies of edgewise oscillations for some Vestas wind turbines are: V90: 1.45 Hz, V100: 1.08 Hz, and V120: 1.00 Hz.

In another embodiment of the invention the detection means 21 could be other types of sensors than accelerometers 22—such as microphones, strain-gauges, optical fibres or other, it or they could be placed differently in the nacelle 3 or the detection means 21 could be placed outside the nacelle 3 such as in the hub or in or on one or more of the blades 5.

The detection means 21 is in this embodiment of the invention connected to control means 25. If edgewise oscillations of the blades 5 are detected or if edgewise oscillations above a certain level are detected, the control means 25 can initiate that the blades 5 are pitched.

As previously explained the blades 5 of an active stall regulated wind turbine 1 or a pitch regulated wind turbine are provided with a pitch mechanism 13. In the illustrated embodiment the blades 5 of the wind turbine 1 are connected to the hub through pitch bearings 23, enabling that the blades 5 can rotate around their longitudinal axis.

In this embodiment the pitch mechanism 13 comprise means for rotating the blades in the form of linear actuators 24 connected to the hub and the respective blades 5. In a preferred embodiment the linear actuators 24 are hydraulic cylinders. In another embodiment the pitch mechanism 13 could comprise stepper motors or other means for rotating the blades 5.

In this embodiment the control means 25 is placed in the hub but in a more preferred embodiment the control means 25 would be placed in the nacelle 3, in the tower 2, in a neighboring house or elsewhere e.g. at the same location as the general pitch control means (not shown) for the controlling the pitch in relation to load or power or even integrated in these general pitch control means.

In this embodiment the control means are connected to the linear actuators 24 for controlling the pitch angle of the blades 5 in response to the measurements of the detection means 21.

If the size of the edgewise oscillations—detected by the accelerometer 22 in the nacelle 3—is above a certain level such as 0.35 meters/sec$^2$, the control means 25 provides a signal ensuring that the all the blades 5 are pitched e.g. 6.5° in a direction which reduces the blades 5 ability to "absorb" the energy of the wind i.e. the blades is turned in a direction making the blade chord C more parallel with the direction of the relative wind on a pitch controlled wind turbine 1 and in a direction making the blade chord C more perpendicular with the direction of the relative wind on a active stall controlled wind turbine 1.

In another embodiment of the invention the detection means 21 could be placed in the blades 5, enabling that the size of the edgewise oscillations can be detected for each blade 5 individually. Hereby is also enabled that only the specific blade 5 or blades 5 oscillating above a predetermined level is pitched.

In an embodiment of the invention the blades 5 are returned to their original or substantially to their original position, immediately or after a specific predetermined time but in a preferred embodiment the blades 5 are returned, when the detection means 21 detects that the size of the oscillations has dropped below a certain predefined level again.

If the edgewise oscillations are not eliminated or has dropped below a predetermined level within a predetermined period of time the control means 25 will send of an alarm. Likewise, if the edgewise oscillations continues to grow in size—even though the control means 25 has send a signal to pitch the blades 5—an alarm signal is send.

The invention has been exemplified above with reference to specific examples of wind turbines 1, detection means 21, methods for damping edgewise oscillations and other. However, it should be understood that the invention is not limited to the particular examples described above but may be designed and altered in a multitude of varieties within the scope of the invention as specified in the claims.

What is claimed is:

1. A wind turbine comprising
a rotor including one or more pitchable blades, and
detection means for detecting edgewise oscillations in one or more of said blades,
characterized in that
said wind turbine comprises control means for changing a pitch angle of one or more of said blades if said detection means detects edgewise oscillations in one or more of said blades, hereby damping or eliminating said edgewise oscillations.

2. The wind turbine according to claim 1, wherein said control means comprise means for pitching said blades in a direction which reduces the lift of said blades during normal operation, if said detection means detects edgewise oscillations in one or more of said blades.

3. The wind turbine according to claim 1, wherein said control means comprise means for changing the pitch angle of all the blades of said rotor substantially equally, if said detection means detects edgewise oscillations in one or more of said blades.

4. The wind turbine according to claim 1, wherein said detection means are one or more oscillation sensors placed in a nacelle of said wind turbine.

5. The wind turbine according to claim 4, wherein said oscillation sensors are one or more accelerometers connected to a strengthening structure of said nacelle.

6. The wind turbine according to claim 1, wherein said control means comprise means for changing said pitch angle of one or more of said blades between 0.5° and 30° if said detection means detects edgewise oscillations in one or more of said blades.

7. The wind turbine according to claim 6 wherein said control means comprise means for changing said pitch angle of one or more of said blades between 2° and 15° if said detection means detects edgewise oscillations in one or more of said blades.

8. The wind turbine according to claim 7 wherein said control means comprise means for changing said pitch angle of one or more of said blades between 3° and 8° if said detection means detects edgewise oscillations in one or more of said blades.

9. The wind turbine according to claim 1, wherein said control means comprise means for returning said one or more blades to their original pitch angle position, when said detection means detects that a size of said edgewise oscillations is below a predefined level.

10. The wind turbine according to claim 1, wherein said control means comprise means for only changing the pitch angle of one or more of said blades if said detected edgewise oscillations is above a predefined level.

11. The wind turbine according to claim 1, wherein said control means further comprise a timer for giving of an alarm signal if a size of said edgewise oscillations has not dropped below a pre-defined level within a predefined period of time.

12. A method for damping edgewise oscillations in one or more blades of turbine, said method comprising the steps of
detecting if one or more of said blades oscillates edgewise, and
changing a pitch angle of one or more of said blades if edgewise oscillations is detected in one or more of said blades.

13. The method according to claim 12, wherein said pitch angle of said one or more blades is only changed if a size of said edgewise oscillations is above a predefined level in one or more of said blades.

14. The method according to claim 12, wherein said one or more blades is returned to their original pitch angle position, when a magnitude of said edgewise oscillations has dropped below a predetermined level.

15. The method according to claim 12, wherein the pitch angle of all of said blades of said wind turbine are changed substantially equally if edgewise oscillations is detected in one or more of said blades.

16. The method according to claim 12, wherein an alarm signal is created if a magnitude of said edgewise oscillations has not dropped below a predetermined level within a predetermined time.

17. The method according to claim 12, wherein said blades are pitched in a direction which reduces lift of said blades during normal operation, if said detection means detects edgewise oscillations in one or more of said blades.

18. The method according to claim 12, wherein said wind turbine is an active stall controlled wind turbine comprising means for detecting edgewise oscillations.

* * * * *